Jan. 17, 1933.  A. LESAGE  1,894,378
STARTING DEVICE FOR OUTBOARD MOTORS
Filed March 3, 1932

Inventor
Alfred Lesage

Patented Jan. 17, 1933

1,894,378

UNITED STATES PATENT OFFICE

ALFRED LESAGE, OF SCHWEINFURT, GERMANY

STARTING DEVICE FOR OUTBOARD MOTORS

Application filed March 3, 1932, Serial No. 596,423, and in Germany March 5, 1931.

The invention relates to a starting device for boat motors, particularly outboard motors in which the starting element operates an automatic coupling with the motor shaft, while uncoupling takes place by overrunning when the motor is working or when the starting device reassumes its initial position.

The object of the invention is to obtain the automatic operation of the clutch during starting the motor and disconnection as long as the motor is running, the clutch being noiseless in either operation and friction reduced to a minimum.

This effect is attained by the employment of relatively movable parts which are continuously engaged with each other by means of screw-threads, the driven part which bears one element of a clutch being further acted upon by a friction device adapted to retard the said part with respect to the driving part in both directions.

Further objects will be disclosed in the following specification and claims.

Two embodiments of the invention are represented in the annexed drawing, which forms a part of this specification, and in which—

Like numerals designate like parts in all figures of the drawing.

Figure 1:
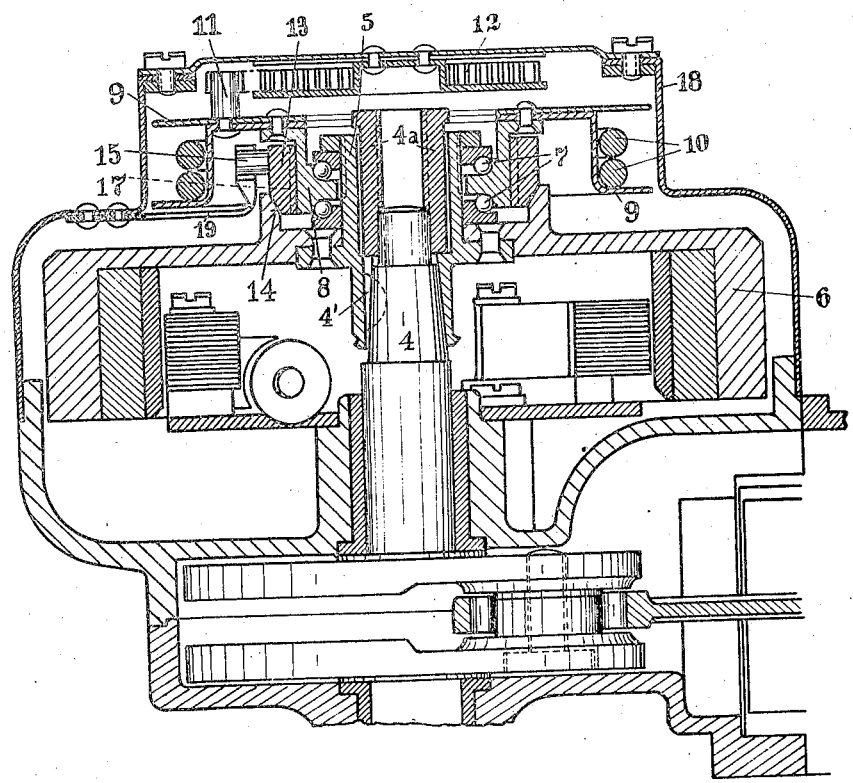
Fig. 1 is a vertical sectional elevation of the starting device.

Referring to Fig. 1, the starting device mounted on the top of an outboard motor, comprises a clutch one part of which is rigidly arranged on the flywheel 6 of the motor. This flywheel is joined to a bearing sleeve 5 which on its part is fixed to the upper end of the motor crank shaft 4 by means of a sleeve nut 4a screwed thereon and a key 4'. On the periphery of said sleeve 5 a two-row ball bearing 7 is provided by which the hub 8 of a cord drum 9 is easily rotatably supported. The said cord drum receives on its circumference the pull or starting cord 10 passing through an opening (not shown) of the case 18 to the outside, and is connected by a pin 11 to the outer end of a spiral spring 12 fastened to the said case and immobilized thereto with its inner end. The spring 11 tends to keep the said drum in its neutral position in which the cord 10 is wound upon it. The circumference of the hub 8 is provided with a thread 17 on which a coupling ring 13 internally correspondingly threaded can be axially moved up and down through the relative rotation of the said threads. Between the ring 13 and a flange of the flywheel 6 there is provided a conical friction clutch 14. A spring-mounted friction brake 15 fastened with its resilient bearer 19 to the motor hood 18 bears against the circumference of the ring 13.

The starting device operates as follows—

When the drum 9 and its hub 8 is imparted a rotary movement by a quick pull of the end of the cord 10 projecting from the motor hood, the coupling ring 13 retained by the friction brake 15 will be screwed down by the action of the engaged threads 17 of the parts 8 and 13 until the clutch 14 will be engaged, whereupon the flywheel and the crank shaft will be rotated too so that starting of the motor takes place. At the same time the spring 12 is put under higher tension. When after starting the motor is running the engaged clutch 14 will overcome the friction of the brake 15 and rotate the coupling ring 13 with the flywheel relatively to the hub 8 which is then held stationary, so that the ring 13 will be screwed upwards and the clutch 14 disengaged automatically. When subsequently the cord 10 is released, the spring 12 will turn the drum 9 inversely whereby the cord is wound thereon again, while the coupling ring 13 is further screwed back to its initial position. Should the motor not start at once, the same return-movement of the parts will nevertheless take place so that the starting operation may be repeated several times.

The device is automatic for coupling and uncoupling and requires but small space on account of its being placed concentrically in the motor hood.

Figures 2, 3:
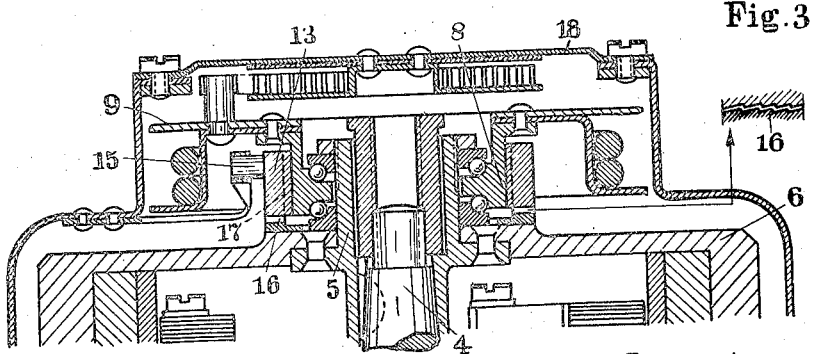
Fig. 2 is a similar sectional elevation of a modification of the device.
Fig. 3 is a sectional view of a detail.

The modification illustrated in Fig. 2 differs from the embodiment above described only by the type of clutch used, it being in this case a toothed coupling 16 with small teeth as shown in Fig. 3, substituting the conical friction clutch 14.

What I claim as my invention is—

1. In a starting device for internal combustion motors, the combination with the crank shaft of the motor, of a flywheel fixed on the said shaft, a cord drum rotatably mounted with its hub coaxial with the flywheel, a cord attached to said drum, a reversing spring attached to the cord drum, a coupling ring, interengaged screw threads provided between the hub of the drum and the said coupling ring, a clutch adapted to connect and disconnect the said coupling ring with the flywheel, and a friction brake acting on the coupling ring.

2. In a starting device for internal combustion motors, the combination with the flywheel of the motor, a central sleeve joined to the flywheel, a cord drum, a pull cable connected to the drum, a spring adapted to return the drum, a hub of the drum, an antifrictional bearing supporting the drum upon said central sleeve, a coupling ring, interengaging screw threads on the hub of the drum and on the coupling ring, a clutch capable of connecting the coupling ring to the flywheel, and a stationary friction brake acting upon the coupling ring.

In testimony whereof, I have signed my name to this specification.

ALFRED LESAGE.